(12) United States Patent
Denny

(10) Patent No.: US 6,302,426 B1
(45) Date of Patent: *Oct. 16, 2001

(54) STRENGTHENING RIB

(75) Inventor: Martin Lee Denny, Des Moines, IA (US)

(73) Assignee: DICO, Inc., Des Moines, IA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 549 days.

(21) Appl. No.: 09/002,537

(22) Filed: Jan. 2, 1998

Related U.S. Application Data

(63) Continuation of application No. 08/217,744, filed on Mar. 25, 1994, now abandoned.

(51) Int. Cl.[7] .................................................. B60D 1/06
(52) U.S. Cl. ................................... 280/511; 280/504
(58) Field of Search ........................ 280/491.1, 495, 280/491.5, 504, 507, 511, 512, 513; 29/509, 897.35; 59/481.1, 729.5; 296/188, 191, 193; D12/196, 106, 223

(56) References Cited

U.S. PATENT DOCUMENTS

| | | | |
|---|---|---|---|
| 1,833,043 | * 11/1931 | Sheldon . | |
| 2,093,608 | * 9/1937 | Kelley et al. . | |
| 2,141,919 | * 12/1938 | Kotrbaty . | |
| 2,269,976 | * 1/1942 | Hyman | 280/491.1 |
| 3,888,517 | * 6/1975 | Ray | 280/512 |
| 5,421,612 | * 6/1995 | Floe | 280/789 |

FOREIGN PATENT DOCUMENTS

| | | | |
|---|---|---|---|
| 618135 | * 4/1961 | (CA) | 280/512 |
| 0301153 | * 2/1989 | (EP) | 280/511 |
| 2236514 | * 4/1991 | (GB) | 280/507 |

* cited by examiner

*Primary Examiner*—Anne Marie Boehler
(74) *Attorney, Agent, or Firm*—Daniel A. Rosenberg; Kent A. Herink; Davis Brown Law Firm

(57) ABSTRACT

An improved trailer hitch housing is provided having a pair of integrated ribs extending the length of each side of the housing. The ribs strengthen and stiffen the housing by decreasing the tendency of the sides to bend when subjected to stress. The need for internal bracing or end flanges, which are used in prior art devices for strength and stiffness, is eliminated by the use of the ribs.

22 Claims, 1 Drawing Sheet

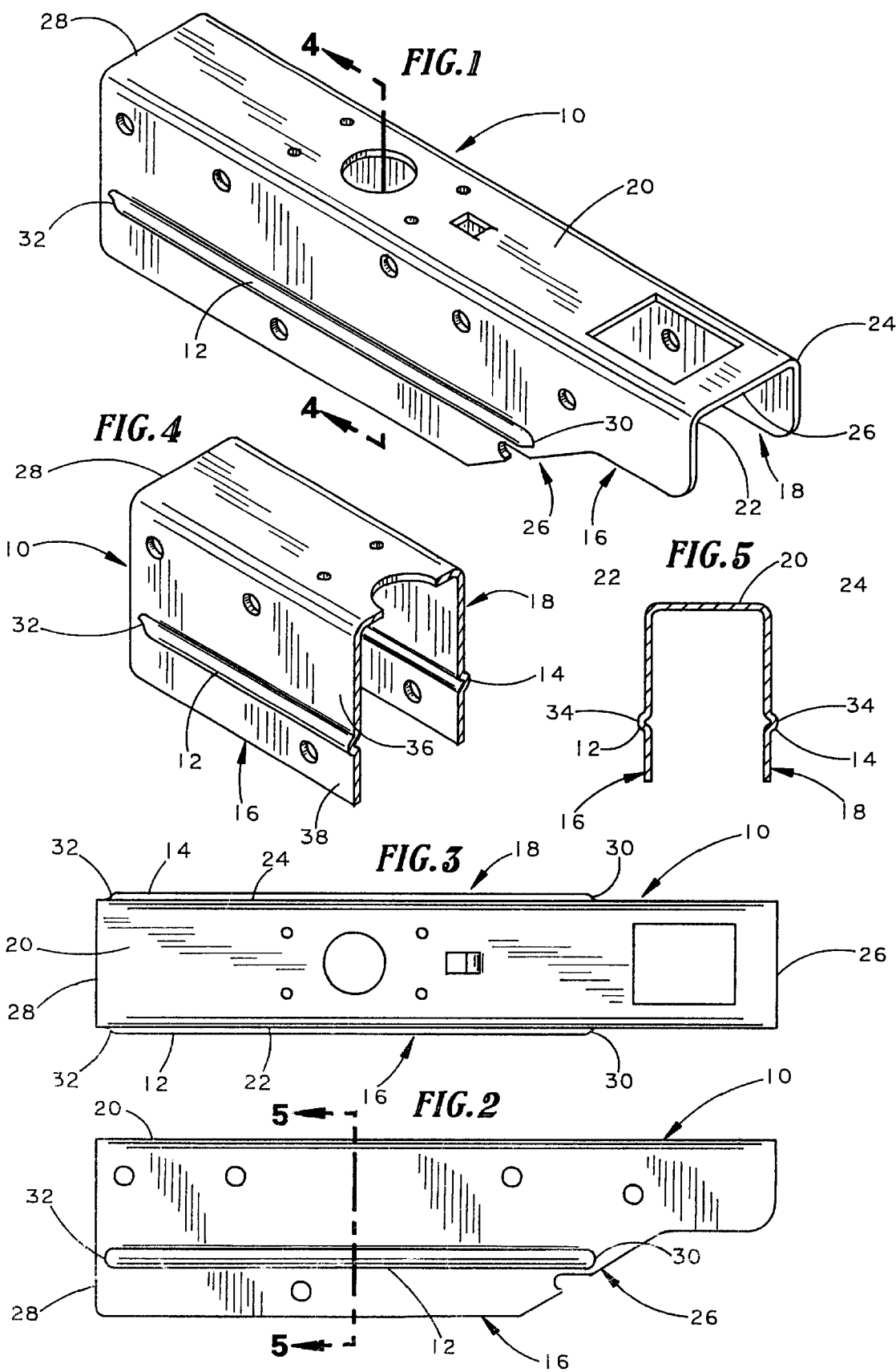

STRENGTHENING RIB

This application is a continuation of Ser. No. 08/217,744, filed Mar. 25, 1994, now abandoned.

BACKGROUND OF THE INVENTION

The present invention relates generally to trailer hitches and, more particularly, to a trailer hitch housing independently supported by strengthening ribs provided along the sides of the housing.

Trailer hitch housings are well-known in the art. The housings are connected to trailers by means of bolts, weldments, or similar securement means. The housings are typically designed to cover and support socket assemblies, which are used to releasably attach the trailer to a hitch ball of a pulling vehicle. The housing must, therefore, be extremely strong to maintain its integrity as the trailer is being pulled. Although most housings are constructed of steel or a similarly rigid metal, they are not immune to damage from external forces. As housings are used, they are subjected to many forces which act to deflect or bend the housings. If housings were to succumb to such forces the housing would fail leading to potential injury to both persons and property. Accordingly, internal bracing or end-flanges are typically required to produce housings capable of withstanding these deflecting and bending forces. However, since internal bracing and end-flanges add weight and cost to the housings, it is desirable to provide a housing which is low cost and relatively lightweight.

Housings generally consist of a pair of sides and a cover secured to and mounted between the sides. Alternatively, the housing may be constructed of a single sheet of metal which is formed into a pair of sides and a cover. Several housings have been designed in an attempt to provide a relatively thin, lightweight housing with the strength required for towing a trailer. The two most popular designs are the end-flanged design and the internally braced design.

In the end-flanged design, a small portion of the bottom edges of the sides of the housing are turned outwardly to reduce the tendency of the sides to deflect or bend under pressure. While this design adds stability to the housing, the flanges detract from the aesthetic quality of the housing. Furthermore, the housing must still be constructed of a relatively thick material to withstand deflection between the end-flanges and the cover. The exposed flanges also have undesirable sharp corners which tend to catch and snag on nearby articles.

The internally supported design typically has internal braces or supports which extend between the sides of the housing and are secured thereto by weldments or bolts. As the internal braces must be relatively sturdy and placed throughout the housing, the internal support structure adds a significant amount of weight to the housing. The weldments or bolts making up the internal support structure are often visible on the exterior of the housing and, therefore, detract from the housing's aesthetic quality. Additionally, the placement of the braces within the housing requires a significant amount of additional labor, which adds a significant amount of time and cost to the manufacture of the housing. The braces also block much of the internal portion of the housing, thereby hindering the placement of surge suppressors, locks, or other apparatuses which may need to be placed within the housing.

The difficulties encountered in the prior art discussed hereinabove are substantially eliminated by the present invention.

SUMMARY OF THE INVENTION

Accordingly, it is an object of the present invention to provide a trailer hitch housing which resists deflection and bending, but is not significantly heavier than a trailer hitch housing having no buckling or twisting supports.

It is another object of the present invention to provide a trailer hitch housing with a strengthening member which does not add a significant increase in bulk to the housing.

Still another object of the present invention is to provide a trailer hitch housing having an aesthetically appealing appearance.

It is another object of the present invention to provide a trailer hitch housing which eliminates the need for an internal support structure.

By the present invention, it is proposed to overcome the difficulties encountered heretofore. To this end, a fully externally supported trailer hitch housing is provided capable of operably connecting a trailer to a pulling vehicle. The housing has a first side divided into a first lower plate and a first upper plate by a first strengthening rib. The first strengthening rib is capable of independently supporting and strengthening the first side of the housing as the trailer is being pulled by the vehicle. The housing also has a second side constructed similar to the first side having a second strengthening rib capable of independently supporting and strengthening the second side of the housing as the trailer is being pulled by the pulling vehicle. A housing cover is provided which is attached to and interconnects the first side and second side of the housing. Preferably, the lower plates are smaller than the upper plates and the strengthening rib is disposed across the entire length of the sides, to provide the greatest strength and durability.

BRIEF DESCRIPTION OF THE DRAWINGS

In the drawings:

FIG. 1 is a perspective view of a trailer housing provided with a strengthening rib according to the present invention;

FIG. 2 is a side elevational view of the trailer housing;

FIG. 3 is a top plan view of the trailer housing;

FIG. 4 is a perspective view of the trailer housing in partial cross-section taken along line 4—4 of FIG. 1; and FIG. 5 is a cross-section of the trailer housing taken along line 5—5 of FIG. 2.

DETAILED DESCRIPTION OF THE INVENTION

The invention relates to a trailer hitch housing 10 being provided with a first rib 12 and a second rib 14, which strengthen and support the housing 10 to counter buckling, bending, and twisting forces to which the housing 10 is subjected (FIG. 4).

In the figures, a trailer hitch housing 10 is shown having a first side 16 and a second side 18 (FIG. 1). The sides 16 and 18 are preferably constructed of steel to give the housing 10 added 10 durability and strength. Interconnecting the sides 16 and 18 is a housing cover 20 which is also preferably constructed of steel (FIGS. 1 and 3). Although the housing cover 20 may be welded to the sides 16 and 18, it is preferable to construct the housing 10 of a single sheet of steel, bent at a first corner 22 and a second corner 24 to form the two sides 16 and 18, the cover 20, and a front 26 and a back 28.

The ribs 12 and 14 are formed in the sides 16 and 18 by cold working or similar metal working means (FIG. 5). Cold working is the preferred method of forming the ribs 12 and 14 as it provides the ribs 12 and 14 with the strength needed to withstand the forces to which the housing 10 is subjected. Preferably the cold working is done in a manner which allows the width of the steel forming the ribs 12 and 14 to be of substantially the same width as the sides 16 and 18, and which provides the ribs 12 and 14 with a front 30 and a rear 32 (FIGS. 2 and 5). The ribs 12 and 14 are preferably formed to provide crests 34 having arcuate cross-sections, rather than pointed cross-sections, to reduce the chance of the housing 10 folding along the ribs 12 and 14 when subjected to external forces (FIG. 5). Preferably, the ribs 12 and 14 are provided parallel to the housing cover 20, within one centimeter from the front 26 and one centimeter from the rear 28 of the housing 10 (FIGS. 1 and 4). The front 30 and a rear 32 of the ribs 12 and 14 are preferably rounded to eliminate any sharp angles which may snag or damage articles contacting the ribs 12 and 14. By eliminating the internal support structure present in most prior art housings, the ribs 12 and 14 decrease the weight and bulk of the housing 10, opening up the interior of the housing 10 for placement of surge suppressors (not shown) or other devices. The ribs 12 and 14 also add attractive aesthetics to the housing 10.

The rib 12 is preferably positioned to divide the side 16 into a larger, upper portion 36 and a smaller lower portion 38 (FIG. 4). This positioning of the rib 12 provides maximum support to the housing 10, as the larger, upper portion 36 is strengthened and supported by both the housing cover 20 and the rib 12, while the smaller, lower portion 38, needing less strength and support due to its smaller surface area, is supported only by the rib 12. The rib 14 is preferably positioned at an identical orientation on the opposite side 18 to provide similar benefits.

The increase in strength afforded by the ribs 12 and 14 is directly related to the resistance of the sides 16 and 18 to deflection. For a flat plate the equation for deflection is:

$$Y = \frac{Fl^3}{3EI}$$

wherein Y is the deflection in inches, F is the force on the plate, 1 is the length of the plate, E is the modulus of elasticity of the material, and I is the moment of inertia. The equation for the moment of inertia is given as follows:

$$I = \frac{bh^3}{12}$$

wherein b is the length of the plate and h is the height of the plate. Accordingly, compared to a flat plate of an identical length, a ribbed plate has a greater height and, therefore, a greater moment of inertia.

Adding the ribs 12 and 14 to the sides 16 and 18 of the housing 10 increases the moment of inertia of the sides 16 and 18, thereby decreasing the deflection and increasing the strength of the sides 16 and 18 as well. The increased strength provided by the ribs 12 and 14 is sufficient to eliminate the need for internal bracing or end flanges.

The foregoing description and drawings merely explain and illustrate the invention and the invention is not limited thereto, except insofar as the claims are so limited, as those skilled in the art who have the disclosure before them will be able to make modifications and variations therein without departing from the scope of the invention. By way of example, it should be clear that the ribs 12 and 14 may be inverted so that the crests 34 of the ribs 12 and 14 are on the interior rather than the exterior of the housing 10. By way of further example, it should be clear that numerous ribs of varying length may be provided over the sides 16 and 18 of the housing.

What is claimed is:

1. A fully externally supported trailer hitch housing for a trailer hitch, the housing being capable of operably connecting a trailer to a pulling vehicle, the housing comprising:

a. a first side having a first lower plate, a first upper plate, and a first strengthening rib positioned between said first upper plate and said first lower plate, wherein said first strengthening rib is capable of independently supporting and strengthening said first lower plate as the trailer is being pulled by the pulling vehicle, and wherein said first strengthening rib is arcuate in cross section;

b. a second side having a second lower plate, a second upper plate, and a second strengthening rib positioned between said second upper plate and said second lower plate, wherein said second strengthening rib is capable of independently supporting and strengthening said second lower plate as the trailer is being pulled by the pulling vehicle, and wherein said second strengthening rib is arcuate in cross section; and c. a housing cover operably attached to and interconnecting said first side and said second side.

2. The housing of claim 1, wherein said first strengthening rib and said second strengthening rib are substantially parallel to said housing cover.

3. The trailer hitch housing of claim 1, wherein said first strengthening rib is disposed along substantially the entire length of said first side and said second strengthening rib is disposed along substantially the entire length of said second side.

4. The trailer hitch housing of claim 1, wherein said first lower plate is smaller than said first upper plate and said second lower plate is smaller than said second upper plate.

5. The trailer hitch according to claim 1, wherein said first lower plate, said first upper plate, said first strengthening rib, said second lower plate, said second upper plate, said second strengthening rib, and said housing cover are all formed by a single sheet of metal.

6. The trailer hitch housing according to claim 1, wherein said first lower plate and said second lower plate each have a lower edge, and wherein said lower edges are free along substantially their entire lengths.

7. The trailer hitch housing according to claim 1, wherein each of said side plates are substantially the same thickness as said strengthening ribs.

8. The trailer hitch housing according to claim 1, wherein said first strengthening rib of said first side further comprises a first and a second rounded end, and said second strengthening rib of said second side further comprises a first and a second rounded end.

9. The trailer hitch housing according to claim 1 wherein said first and second strengthening ribs have a rounded ends.

10. A fully externally supported trailer hitch housing for a trailer hitch, the housing being capable of operably connecting a trailer to a pulling vehicle, the housing comprising:

a single piece first side plate having a first strengthening rib integrated therewith, said first strengthening rib being located intermediately between an upper edge and a lower edge of said first side plate, said lower edge of said first side plate being free along its entire length, said first strengthening rib being capable of independently supporting and strengthening said first side plate between said lower edge of said first side plate and said first strengthening rib as the trailer is being pulled by the pulling vehicle;

a single piece second side plate having a second strengthening rib integrated therewith, said second strengthening rib being located intermediately between an upper edge and a lower edge of said second side plate, said lower edge of said second side plate being free along its entire length, said second strengthening rib being capable of independently supporting and strengthening said second side plate between said lower edge of said second side plate and said second strengthening rib as the trailer is being pulled by the pulling vehicle; and a housing cover interconnecting said first side plate and said second side plate.

11. The trailer hitch housing according to claim 10, wherein said first strengthening rib and said second strengthening rib are substantially parallel to said housing cover.

12. The trailer hitch housing according to claim 10, wherein said first strengthening rib is disposed along substantially the entire length of said first side plate and said second strengthening rib is disposed along substantially the entire length of said second side plate.

13. The trailer hitch housing according to claim 10, wherein:
 a. said first side plate and said first strengthening rib integrated therewith are a single sheet of metal; and
 b. said second side plate and said second strengthening rib integrated therewith are a single sheet of metal.

14. The trailer hitch housing according to claim 13, wherein said strengthening ribs are formed in said single sheets of metal by cold working.

15. The trailer hitch housing according to claim 13, wherein said strengthening ribs are arcuate in cross section.

16. The trailer hitch housing according to claim 10, wherein said first side plate, said first strengthening rib, said second side plate, said second strengthening rib, and said housing cover are all formed by a single sheet of metal.

17. The trailer hitch housing according to claim 10, wherein each of said side plates are substantially the same thickness as said strengthening ribs.

18. The trailer hitch housing according to claim 10, wherein said first strengthening rib of said first side further comprises a first and a second rounded end, and said second strengthening rib of said second side further comprises a first and a second rounded end.

19. The trailer hitch housing according to claim 10 wherein said first and second strengthening ribs have a rounded ends.

20. A fully externally supported trailer hitch housing for housing a trailer hitch, the housing being capable of connecting a trailer to a pulling vehicle, the housing comprising:
 a. a first side plate having an upper edge and a lower edge;
 b. a first strengthening rib disposed along substantially the entire length said first side plate intermediately between said upper edge of said first side plate and said lower edge of said first side plate, and parallel to said upper edge of said first side plate, said first strengthening rib being arcuate in cross section;
 c. a second side plate having an upper edge and a lower edge;
 d. a second strengthening rib disposed along substantially the entire length of said second side plate intermediately between said upper edge of said second side plate and said lower edge of said second side plate, and parallel to said upper edge of said second side plate, said second strengthening rib being arcuate in cross section; and
 e. an integrated housing cover interconnecting said upper edge of said first side plate and said upper edge of said second side plate; said housing cover, said side plates, and said strengthening ribs all being formed by a single sheet of metal.

21. The trailer hitch housing according to claim 20, wherein said first strengthening rib further comprises a first and a second rounded end, and said second strengthening rib further comprises a first and a second rounded end.

22. The trailer hitch housing according to claim 20 wherein said first and second strengthening ribs have a rounded ends.

\* \* \* \* \*